(12) United States Patent
Vanhakartano et al.

(10) Patent No.: US 11,181,915 B2
(45) Date of Patent: Nov. 23, 2021

(54) APPARATUS AND METHOD FOR MANEUVERING MARINE VESSEL

(71) Applicant: ABB Schweiz AG, Baden (CH)

(72) Inventors: Santeri Vanhakartano, Helsinki (FI); Pauli Hemmilä, Helsinki (FI)

(73) Assignee: ABB Schweiz AG, Baden (CH)

( * ) Notice: Subject to any disclaimer, the term of this patent is extended or adjusted under 35 U.S.C. 154(b) by 193 days.

(21) Appl. No.: 16/118,702

(22) Filed: Aug. 31, 2018

(65) Prior Publication Data

US 2020/0073392 A1 Mar. 5, 2020

(51) Int. Cl.
*G05D 1/02* (2020.01)
*B63B 49/00* (2006.01)
(Continued)

(52) U.S. Cl.
CPC ............ *G05D 1/0206* (2013.01); *B63B 49/00* (2013.01); *B63H 21/21* (2013.01); *B63H 25/42* (2013.01);
(Continued)

(58) Field of Classification Search
CPC ...... G05D 1/0206–0208; G05D 1/0875; B63B 39/00; B63B 49/00; G01C 21/005;
(Continued)

(56) References Cited

U.S. PATENT DOCUMENTS

| 10,795,366 B1 * | 10/2020 | Arbuckle | G05D 1/0208 |
| 2007/0162207 A1 * | 7/2007 | Shimo | B63H 25/04 701/42 |

(Continued)

FOREIGN PATENT DOCUMENTS

| EP | 1365301 A2 | 11/2003 |
| JP | 2001 287697 A | 10/2001 |

(Continued)

OTHER PUBLICATIONS

European Patent Office, Extended European Search Report issued in corresponding European application No. 19193762, dated May 25, 2020, 2 pp.

(Continued)

*Primary Examiner* — Jeffrey C Boomer
*Assistant Examiner* — Paul Allen
(74) *Attorney, Agent, or Firm* — Leydig, Voit & Mayer, Ltd.

(57) ABSTRACT

Apparatuses and methods for maneuvering marine vessel are disclosed. In an embodiment, the apparatus is configured to: receive a location command defining a future geographic location; receive an orientation command defining an orientation in the future geographic location; and generate required control data for a steering and propulsion system of the marine vessel based on the future geographic location and the orientation. In another embodiment, the apparatus is configured to: receive control data of a current power and angle of the steering and propulsion system; receive control data of a reference power and angle of the steering and propulsion system; and display simultaneously a current representation of the current power and angle, and a reference representation of the reference power and angle, wherein the current representation and the reference representation are both arranged and positioned co-centrically in relation to a representation of the marine vessel.

12 Claims, 9 Drawing Sheets

(51) Int. Cl.
*G01C 21/20* (2006.01)
*B63H 25/42* (2006.01)
*B63H 21/21* (2006.01)

(52) U.S. Cl.
CPC ........ *G01C 21/20* (2013.01); *B63H 2021/216* (2013.01); *B63H 2025/425* (2013.01)

(58) Field of Classification Search
CPC .. G01C 21/20–22; G01C 23/00; B63H 21/21; B63H 25/42; B63H 2021/216; B63H 2025/425
USPC .......................................................... 701/21
See application file for complete search history.

(56) References Cited

U.S. PATENT DOCUMENTS

| | | | |
|---|---|---|---|
| 2010/0023192 A1* | 1/2010 | Rae | B63H 25/04 701/21 |
| 2015/0051836 A1* | 2/2015 | Langford-Wood | G01C 21/36 701/538 |
| 2015/0089427 A1* | 3/2015 | Akuzawa | G05D 1/0206 715/771 |
| 2015/0346730 A1* | 12/2015 | Stephens | G05D 1/0206 701/21 |
| 2016/0101838 A1* | 4/2016 | Kojima | B63H 25/04 701/21 |
| 2016/0125739 A1 | 5/2016 | Stewart et al. | |
| 2016/0264143 A1* | 9/2016 | Martin | G05B 17/02 |
| 2017/0255200 A1* | 9/2017 | Arbuckle | B63H 21/21 |
| 2018/0094934 A1 | 4/2018 | Rivers | |
| 2019/0047675 A1* | 2/2019 | Clark | B63B 23/30 |
| 2019/0361457 A1* | 11/2019 | Johnson | B63H 25/00 |

FOREIGN PATENT DOCUMENTS

| | | |
|---|---|---|
| WO | 2013174673 A1 | 11/2013 |
| WO | 2017/131838 A2 | 8/2017 |
| WO | WO-2019231464 A1 * | 12/2019 ........... G05D 1/0206 |

OTHER PUBLICATIONS

European Patent Office, Partial European Search Report issued in corresponding European application No. 19193762, dated Jan. 14, 2020, 2 pp.

* cited by examiner

800 TOP: SWAY

802 PROFILE: SURGE

804 TOP: YAW

APPARATUS AND METHOD FOR MANEUVERING MARINE VESSEL

FIELD

The invention relates to an apparatus for maneuvering a marine vessel, and a method for maneuvering a marine vessel.

BACKGROUND

Ship maneuvering in harbor areas and other congested areas (such as straits) but also in the high seas is a very demanding task for the mariner.

BRIEF DESCRIPTION

The present invention seeks to provide an improved apparatus for maneuvering a marine vessel, and an improved method for maneuvering a marine vessel.

LIST OF DRAWINGS

Example embodiments of the present invention are described below, by way of example only, with reference to the accompanying drawings, in which FIG. 1 illustrates example embodiments of an apparatus for maneuvering a marine vessel.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiment may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
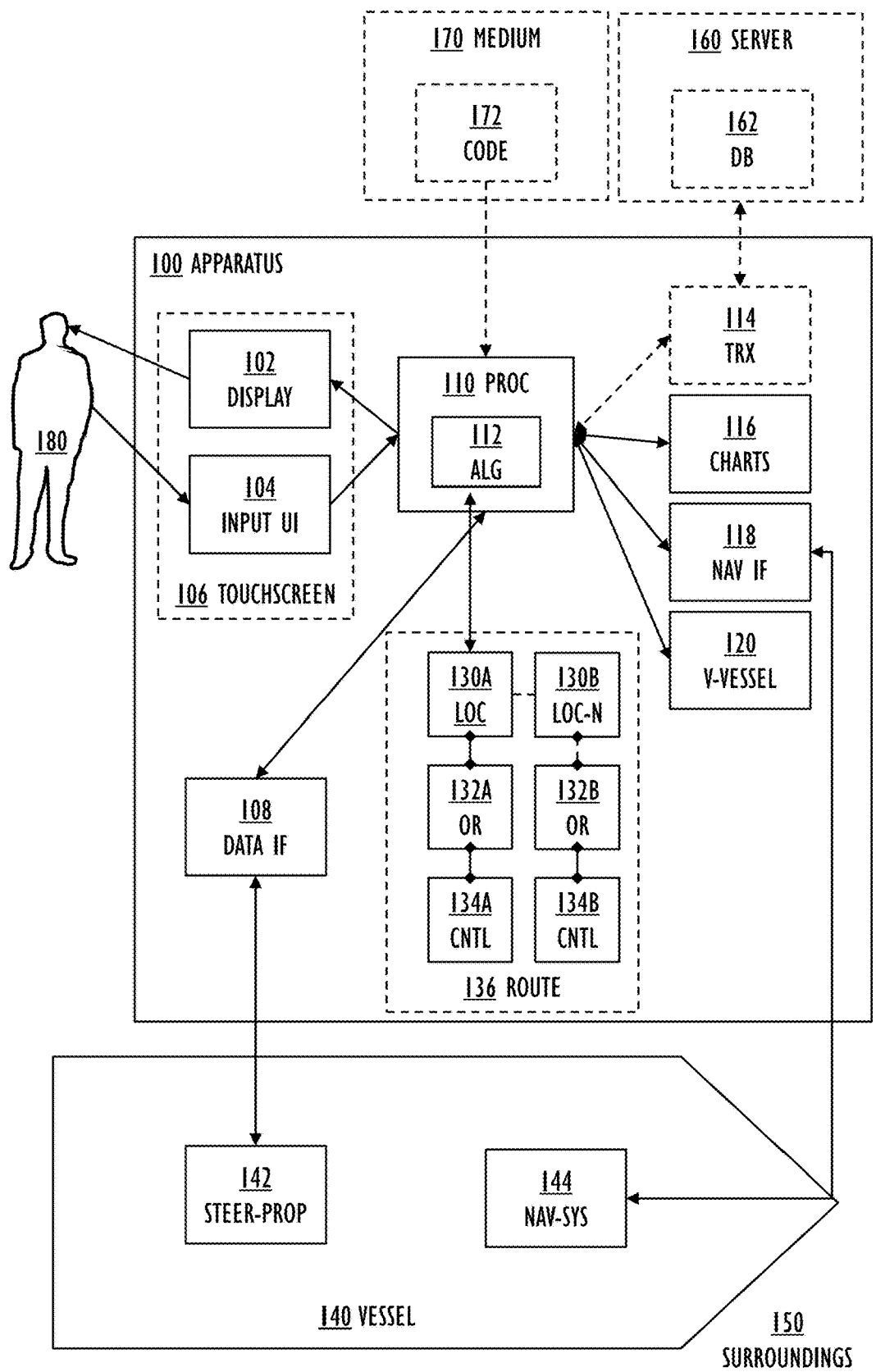

Let us first study FIG. 1 illustrating example embodiments of an apparatus 100 for maneuvering a marine vessel 140. The apparatus 100 may be a stationary apparatus located in a bridge of the marine vessel 140, or the apparatus 100 may also be a portable computing device. The apparatus 100 is for maneuvering the marine vessel 100, and it may interact, via a navigation interface 118, with a navigation system 144 (which may comprise an autopilot, inertial measurement units, a sensor fusion-based speedlog, a satellite positioning receiver of a Global Navigation Satellite System including GPS, Glonass, Galileo or Beidou, etc.) of the marine vessel 140.

The apparatus 100 comprises a display 102 configured to show data of the marine vessel 140, and an input user interface 104 configured to receive commands from a user 180.

The display 102 may be implemented with various technologies, such as:
projected on a window (like in a head-up display, see WO 2013/174673);
as a stationary monitor;
as a touchscreen 106; or
as a part of a mobile device.

The input user interface 104 may be a touch pad (separately or as a part of the touchscreen 106), a joystick, mouse, trackball, keys, touch sensitive area, or another computer user interface technology enabling user input such as focusing a cursor and giving commands.

In an example embodiment, the display 102 configured to show the data of the marine vessel 140 and the input user interface 104 configured to receive the commands from the user 180 are integrated into a touchscreen 106.

The user 180 may be a mariner navigating the marine vessel 140 or assisting as a crewmember: a captain, a navigating officer, an officer, an officer of the watch, a helmsman, or other deck crew member, or even a pilot.

The user 180 may navigate the marine vessel 140 in real-time onboard, or the user 180 may be outside of the marine vessel 140, whereby the user 180 is able to remote control the marine vessel 140 (which may then an unmanned or autonomous ship). The maneuvering may also be non-real-time meaning that the user 180 may plan tricky passages in advance before the actual passage.

The apparatus 100 also comprises a data interface 108 configured to communicate with a steering and propulsion system 142 configured to steer and propel the marine vessel 140.

The apparatus 100 also comprises one or more processing units 110, communicatively coupled with the display 102, the input user interface 104, and the data interface 108.

The communication couplings between these actors 102, 104, 108, 110 may be implemented with appropriate wired/wireless communication technologies and standard/proprietary protocols. In an example embodiment, the wired communication is implemented with a suitable communication technology utilizing coaxial cable, twisted pair or fiber optic such as LAN (Local Area Network) or the Ethernet. In an example embodiment, the wireless communication is implemented with a suitable radio communication technology such as Bluetooth, Wi-Fi or WLAN (Wireless Local Area Network).

The one or more processing units 110 may be implemented with one or more processors including memory (such as a microprocessor) and software, or as an application-specific integrated circuit (ASIC), or as any other way of implementing a device that is capable of processing data.

An example embodiment provides a computer-readable medium 170 storing computer program code 172, which, when loaded into the one or more processing units 110 and executed by one or more processing units 110, causes the one or more processing units 110 to perform the computer-implemented method for maneuvering the marine vessel 140, which will be explained with reference to FIGS. 2 and 3. The computer-readable medium 170 may comprise at least the following: any entity or device capable of carrying the computer program code 172 to the one or more processing units 110, a record medium, a computer memory, a read-only memory, an electrical carrier signal, a telecommunications signal, and a software distribution medium. In some jurisdictions, depending on the legislation and the patent practice, the computer-readable medium 170 may not be the telecommunications signal. In an example embodiment, the computer-readable medium 170 may be a computer-readable storage medium. In an example embodiment, the computer-readable medium 170 may be a non-transitory computer-readable storage medium.

Note that an external computer server 160 comprising a database 162 may augment the processing: complicated calculations may be performed in the server 160, the server 160 may maintain navigational charts 116, the server 160 may contain a virtual representation 120 of the marine vessel 140, etc. The server 160 may be a networked computer server, which interoperates with the one or more processing units 110 according to a client-server architecture, a cloud computing architecture, a peer-to-peer system, or another applicable computing architecture.

To communicate with the server 160, the apparatus 100 may comprise a wireless transceiver 114, utilizing a suitable communication technology such as GSM, GPRS, EGPRS, WCDMA, UMTS, 3GPP, IMT, LTE, LTE-A, 2G/3G/4G/5G, etc. and/or a suitable non-cellular communication technology such as a proprietary/standard radio technology.

Some of the processing may also be provided by another system of the marine vessel 140. For example, the steering and propulsion system 142 may preprocess the data related to its operation and offer an interface to exchange data with the apparatus 100.

Figure 2:
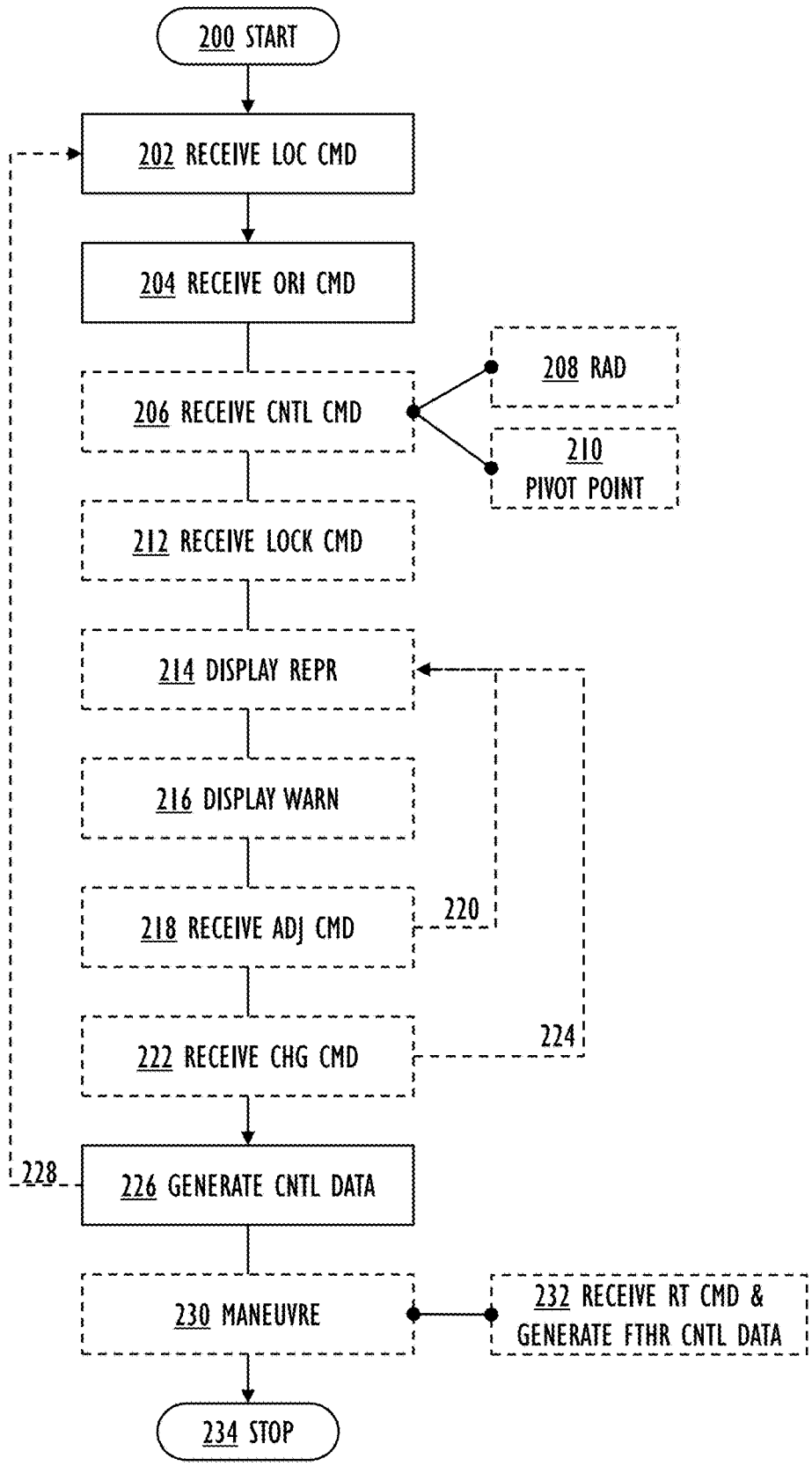
FIGS. 2 and 3 are flow charts illustrating example embodiments of a method for maneuvering the marine vessel.

The one or more processing units 110 are configured to cause the execution of the method described in FIG. 2 in co-operation with the display 102, the input user interface 104, and the data interface 108. The method forms the backbone of an algorithm 112 running in the one or more processing units 110.

Figure 3:
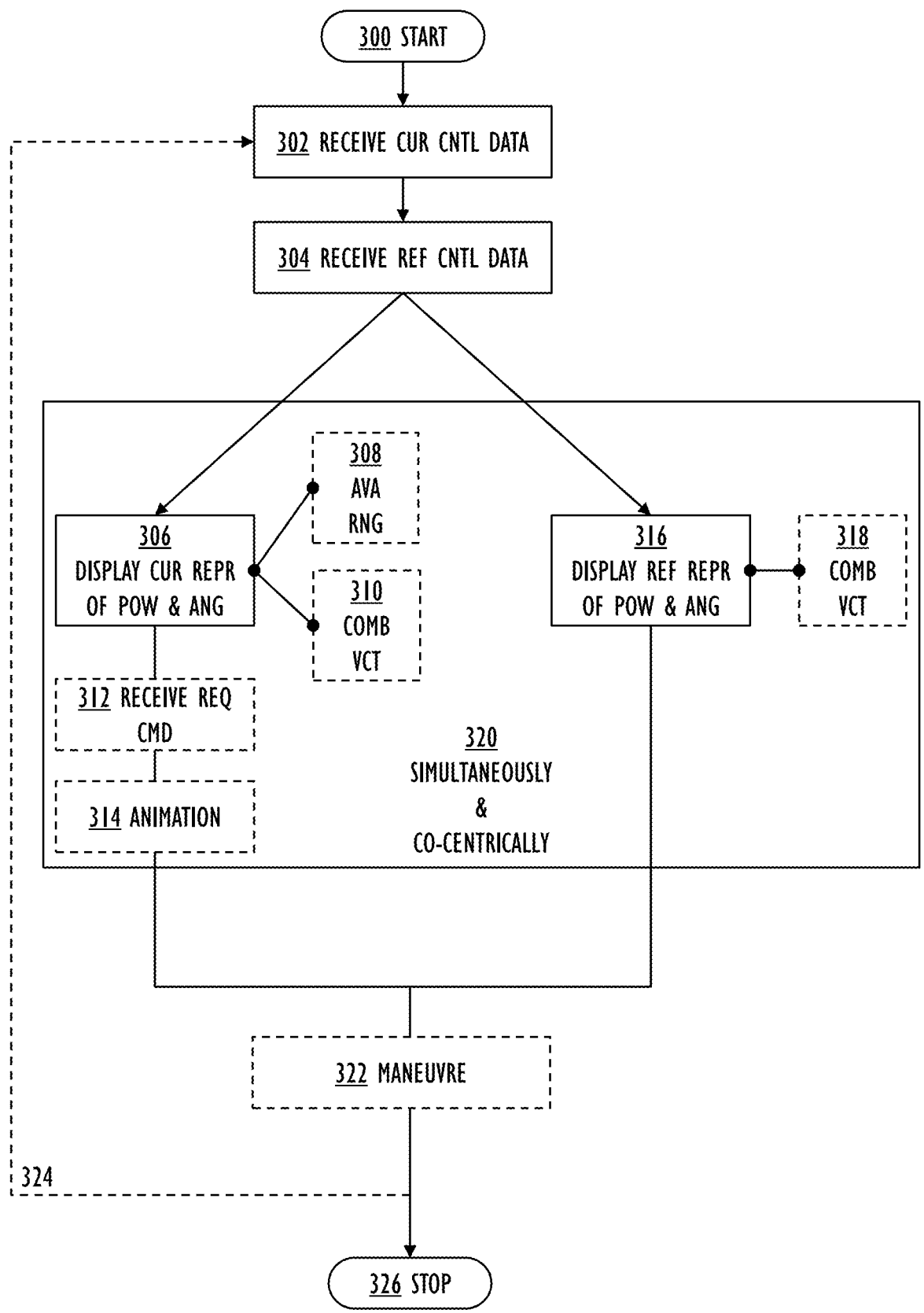

In FIGS. 2 and 3, the operations are not necessarily in a chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or a part of the operation. It should be noted that no special order of operations is required, except where necessary due to the logical requirements for the processing order.

The method starts in 200 and ends in 234 after the processing is finished.

In 202, a location command defining a future geographic location 130A for the marine vessel 140 is received.

In 204, an orientation command defining an orientation 132A of the marine vessel 140 in the future geographic location 130A is received.

In 226, required control data 134A for the steering and propulsion system 142 is generated based on the future geographic location 130A and the orientation 132A.

The control data 134A may comprise operation parameters of the steering and propulsion system 142, including, but not limited to a rudder angle, a propeller angle, a propeller speed, a propeller torque, a propeller power, a propeller pitch, a propeller thrust, an azimuth thruster angle, an azimuth thruster speed, an azimuth thruster torque, an azimuth thruster power, an azimuth thruster pitch, an azimuth thruster thrust, an electric podded azimuth thruster angle, an electric podded azimuth thruster speed, an electric podded azimuth thruster torque, an electric podded azimuth thruster power, an electric podded azimuth thruster pitch, an electric podded azimuth thruster thrust, etc.

Using this sequence comprising three operations 202-204-226, maneuvering of the marine vessel 140 may be planned. This is especially useful when navigating narrow or congested waterways but may also be used to for passage planning.

Figure 4:
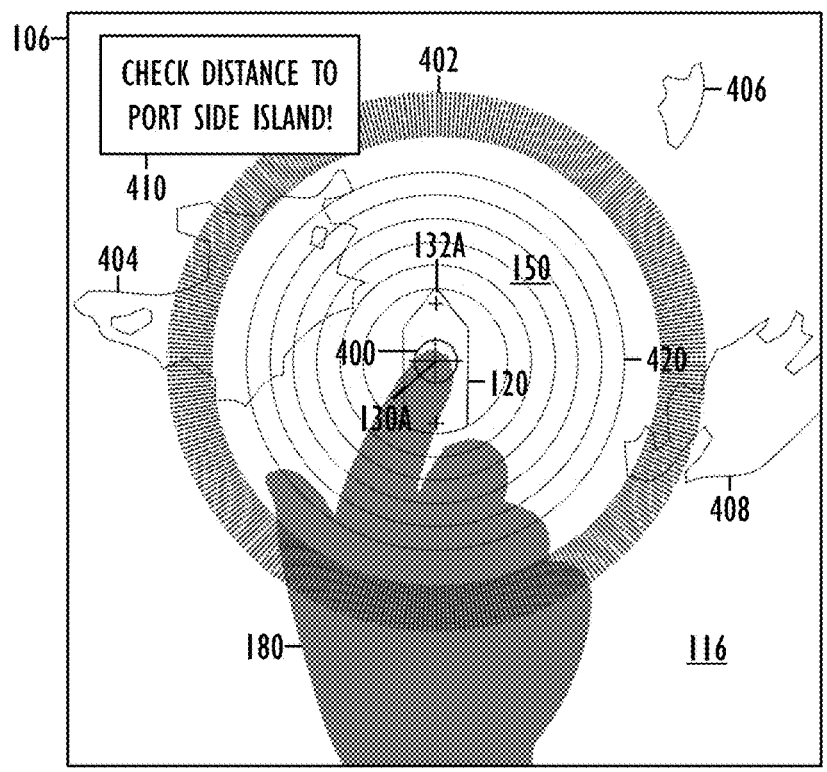
FIGS. 4, 5, 6, 7, 8, 9, 10, 11 and 12 are screenshots illustrating example embodiments of a user interface of the apparatus.

FIG. 4 illustrates an example embodiment of setting the location 130A and orientation 132A using the touchscreen 106.

In an example embodiment, the one or more processing units 110 are configured to display 214 a representation 120 of the marine vessel 140 in the future geographic location 130A in relation to surroundings 150 of the representation 120 of the marine vessel 140 in the future geographic location 130A.

The representation 120 may be visualized in a global coordinate system of the surroundings 150, i.e., in a world coordinate system such as WGS 84, EUREF 89, or a national/international nautical chart coordinate system.

Navigational charts 116 may be shown on the touchscreen 106. Islands 404, 406, 408 surround the representation 120 of the marine vessel 140, so careful maneuvering is necessary.

The user 180 sets the location 130A on the chart 116. The location 130A may be set for a ship midpoint 400 shown on a (virtual) representation 120 of the marine vessel 140. The orientation 132A may be set using a user interface element 402. The user interface element 402 may be implemented as a circular user interface element, possibly with an adjustable radius, as described in Figures. However, in an alternative implementation, the user interface element 402 is configured to set the orientation by one or more fingers manipulating the touchscreen 106. For example, the representation 120 of the marine vessel 140 may include two points by which the representation 120 may be set or rotated to a desired orientation 132A. The orientation 132A may be adjusted as a compass angle. For example, in FIG. 4, the angle is 0 degrees. The representation 120 of the marine vessel 140 is in the same scale as the chart 116, whereby the user 180 is shown a realistic representation of the surroundings 150 of the marine vessel 140.

Additional real-time data may be shown on the touchscreen, such as data received by a marine transponder receiver operating according to AIS (Automatic Identification System), for example.

Figure 5:
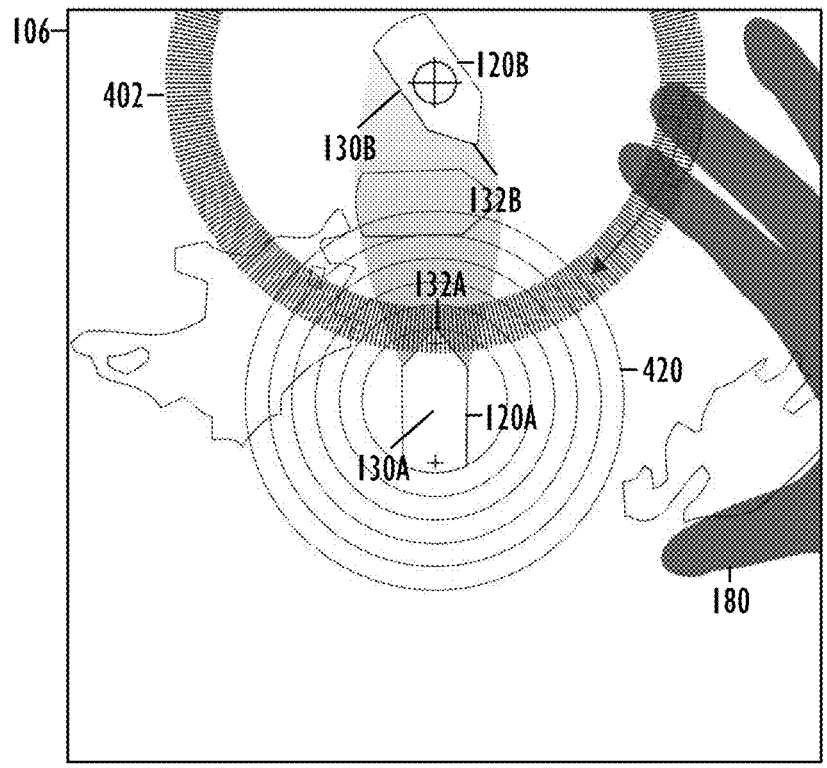

FIG. 5 further illustrates the use of the user interface element 402: the user 180 rotates the user interface element 402 using the touchscreen 106 to set the desired orientation 132A of the representation 120B of the marine vessel 140 in the geographic location 130B.

FIG. 5 also illustrates an example embodiment, wherein the one or more processing units 110 are configured to display simultaneously (with the representation 120B of the marine vessel 140 in the future geographic location 132B) a representation 120A of the marine vessel 140 in a current geographic location 130A of the marine vessel 140 (for illustration, it is now assumed that location 130A is the current geographic location).

Note that in FIGS. 4 and 5, a bull's-eye symbol 420 may be used to indicate a future geographic location 130A that is currently selected for manipulation by the user 180. Alternatively, or additionally, the bull's-eye symbol 420 may be used to indicate a current actual geographic location of the marine vessel 140, see FIG. 10. Especially when indicating the current actual geographic location, the bull's-eye may additionally display a current representation of the current power and the current angle of the steering and propulsion system 142 in relation to the marine vessel 140, and display simultaneously a reference representation of the reference power and the reference angle of the steering and propulsion system 142 in relation to the marine vessel 140, wherein the current representation and the reference representation are both arranged and positioned co-centrically in relation to a representation of the marine vessel 140, as will be later explained with reference to FIG. 12.

In an example embodiment, the one or more processing units 110 are configured to display 216 a warning 410 if the future geographic location 130A or the orientation 132A in the future geographic location 130A is potentially dangerous in relation to surroundings 150 of the marine vessel 140 in the future geographic location 130A. In this example embodiment, the representation 120 of the marine vessel 140 is placed in coordinates (longitude and latitude) of the future geographic location 130A, whereupon it is checked whether the location 130A itself is dangerous (in too shallow water, out of a navigable passage, too near land, etc.) or whether the orientation 132A is dangerous (a heading in a wrong direction in a navigable passage, etc.).

Figure 10:
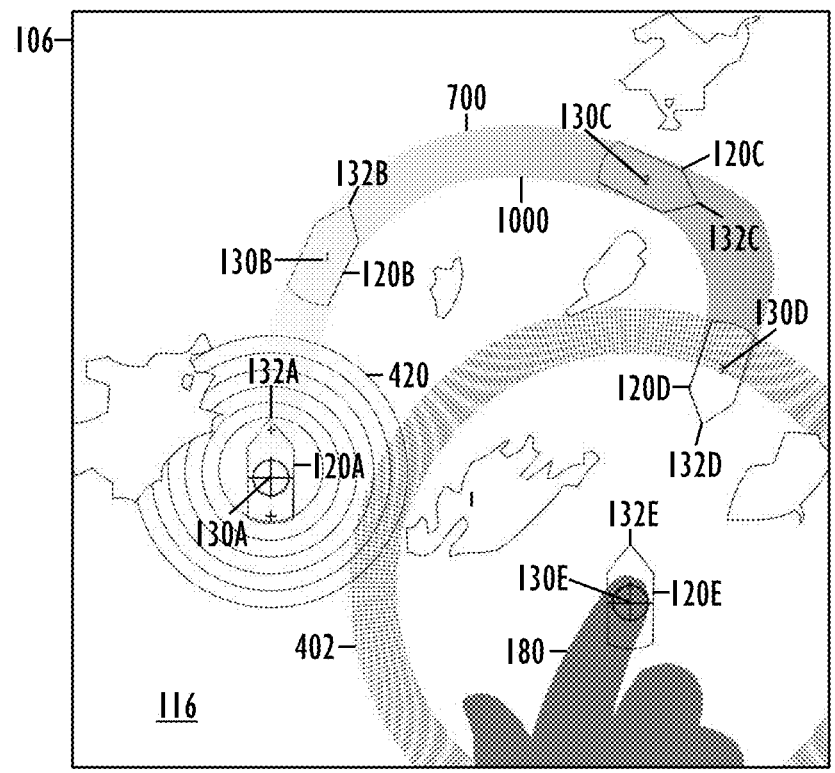

In an example embodiment, the one or more processing units 110 are configured to recursively repeat 228 receiving 202 the location command, receiving 204 the orientation command, and generating 226 the required control data 134A, 134B in order to create a route 136 defined by a plurality of future geographic locations 130A, 130B and a plurality of orientations 132A, 132B. Note that in FIG. 1, N is any integer greater than two denoting the number of the geographic locations. FIG. 10 illustrates an example embodiment of this: the route 136 is defined, starting from 130A as the current geographic location, and continuing via the future geographic locations 130B, 130C, 130D, 130E. The apparatus 100 may interact via the navigation interface 118 with the navigation system 144 in order to maneuver, possibly using the autopilot, along the defined route 136. The geographic locations 130A, 130B, 130C, 130D, 130E may then be considered as waypoints for the navigation system 144. The earlier-mentioned types (angle, speed, torque power, etc.) of the control data 134A, 134B may be augmented or replaced by data defining speed and/or travel-time and/or energy consumption and/or travel-comfort for the whole route, and/or between the geographic locations 130A, 130B, 130C, 130D, 130E.

In an example embodiment, the one or more processing units 110 are configured to display a representation 1000 of a route 136 such that a shape of a presentation of the route 136 illustrates dimensions of the marine vessel 140 in various geographic locations 130A, 130B, 130C, 130D, 130E and orientations 132A, 132B, 132C, 132D, 132E along the route 136. Note that "route" 132 may be between various geographic locations as defined above, or within a movement as defined later. The "route" in this meaning then defines how the outlines of the marine vessel 140 advance from a current geographic location to a future geographic location, or between a plurality of future geographic locations, or within a movement. The shape of the route 136 may be shown on the touchscreen 106: the representation 1000 illustrates the route 136. The representation 1000 may be so precise that it shows the dimensions of the marine vessel 140 during turns and other maneuvers: this can be seen in FIG. 10 as the width of the representation 1000 varies along the route 136. The outline of the representation 1000 shows the dimensions of the marine vessel 140 during the route 136.

In an example embodiment, the one or more processing units 110 are configured to: display an animation showing a representation 120 of the marine vessel 140 advancing along the representation 1000 of the route 136. The navigational chart 116 may remain stationary on the touchscreen 106 and the marine vessel representation 120 moves along the route representation 1000, or, alternatively, the marine vessel representation 120 remains stationary and the route representation 1000 with the underlying chart 106 moves towards the marine vessel representation 120.

In an example embodiment, the one or more processing units 110 are configured to maneuver 230 the marine vessel 140 in relation to the future geographic location 130A using the required control data 134A. This may be implemented so that the maneuvering 230 is performed to arrive at the future geographic location 130A, and/or to steer the marine vessel 140 in the future geographic location 130A. Note that operations 202-204-226 are performed in advance, whereas the maneuvering is 230 is then performed in real-time using the gathered information 130A, 132A, 134A. This example embodiment may be augmented by another example embodiment, wherein the one or more processing units 110 are configured to receive 232 a real-time maneuver command during maneuvering 230 the marine vessel 140 in the future geographic location 130A, generate 232 further control data for the steering and propulsion system 142 based on the maneuver command, and maneuver 230 the marine vessel 140 in the future geographic location 130A using the further control data. With this example embodiment, the user 180 may adjust the earlier-planned maneuvering to consider observed real circumstances in the surroundings 150 of the marine vessel 140. If the maneuvering is done by the autopilot of the navigation system 144, this example embodiment enables a real-time human intervention by the operator 180 to fine-adjust the geographic location 130A, orientation 132A, movement, or some other parameter related to the required control data 134A.

Figure 6:
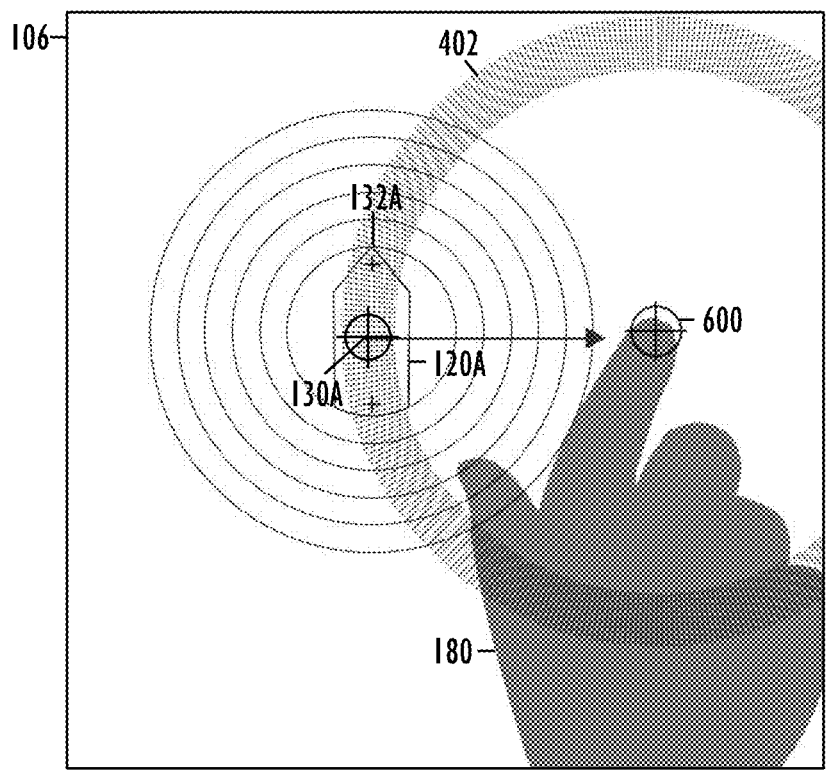
Figure 7:
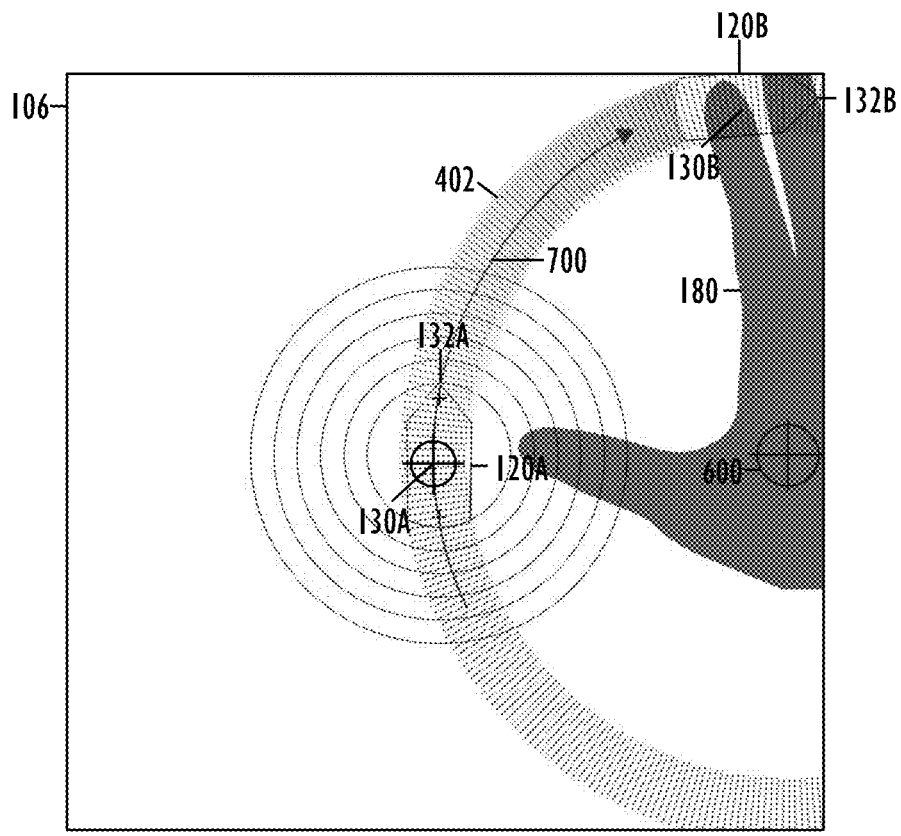

FIGS. 6 and 7 illustrate an example embodiment enabling planning of a dynamic motion for the marine vessel 140. The one or more processing units 110 are configured to receive 206 a control command defining a control point 600 for a movement 700 of the marine vessel 140 starting from the orientation 132A in the future geographic location 130A.

In an example embodiment, the one or more processing units 110 are configured to display 214 the representation 120A, 120B of the marine vessel 140 in the future geographic location 130A, 130B during the simulated movement 700 according to a turning radius 208 of the marine vessel 140 defined in the control command in relation to the control point 600. As can be seen, the movement 700 is along an arc defined by the user interface element 402 around the control point 600.

FIGS. 6 and 7 also serve to clarify that the earlier defined operations, receiving the location command in 202 and receiving the orientation command in 204, may also be realized by another kind of user interface operation: the user 180 sets the control point 600 and manipulates the user interface element 402, whereby the future geographic location 130B and the orientation 132B are set (starting from the current/previous future geographic location 130A and orientation 132A).

In an example embodiment, the one or more processing units 110 are configured to perform the adjustment illustrated in FIGS. 6 and 7 in a recursive fashion:

display 214 a representation 120B of the marine vessel 140 in the future geographic location 132B during the simulated movement 700 according to the control point 600 in relation to the surroundings 150 of the marine vessel 140 in the future geographic location 130B; and
either receive a confirmation command; or
receive 218 an adjustment command adjusting the control point 600 for the movement 700 of the marine vessel 140 in the future geographic location 130B and display 214 the simulated movement 700 according to the adjusted control point, and recursively 220 repeat until the confirmation command is received.

This may be implemented so that the user 180 may recursively move the control point 600 and/or adjust the radius (or diameter) of the user interface element 402 around the control point 600.

In an example embodiment, the one or more processing units 110 are configured to display 214 the representation 120B of the marine vessel 140 in the future geographic location 130B during the simulated movement 700 according to a pivot point 600 defined in the control command defining a center point 600 of a rotation 402 of the marine vessel 140. In effect, the adjustable pivot point 600 is an adjustable ship rotation origin.

Figure 8:
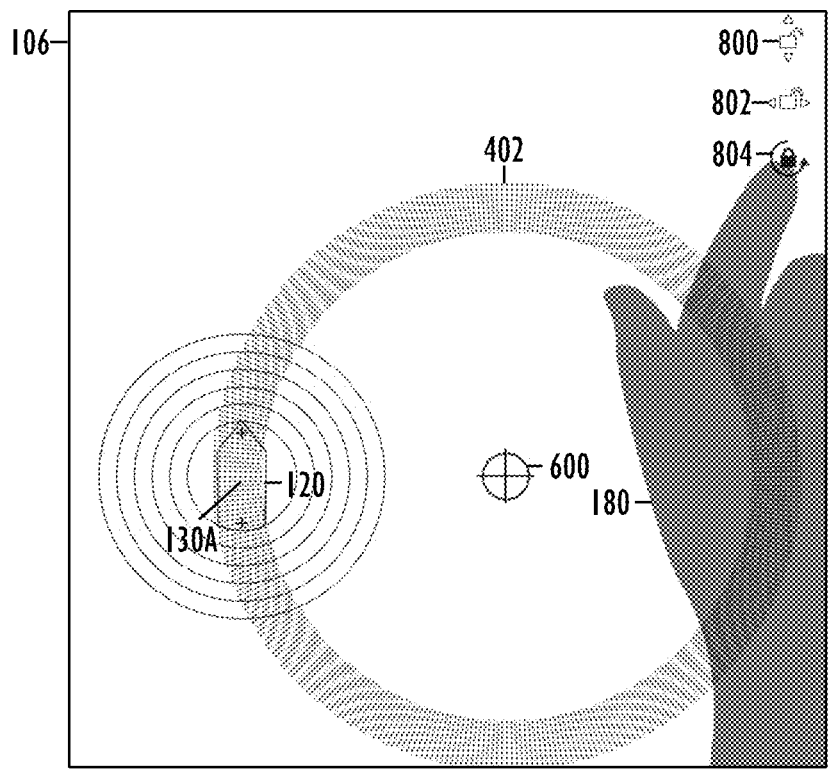
Figure 9:
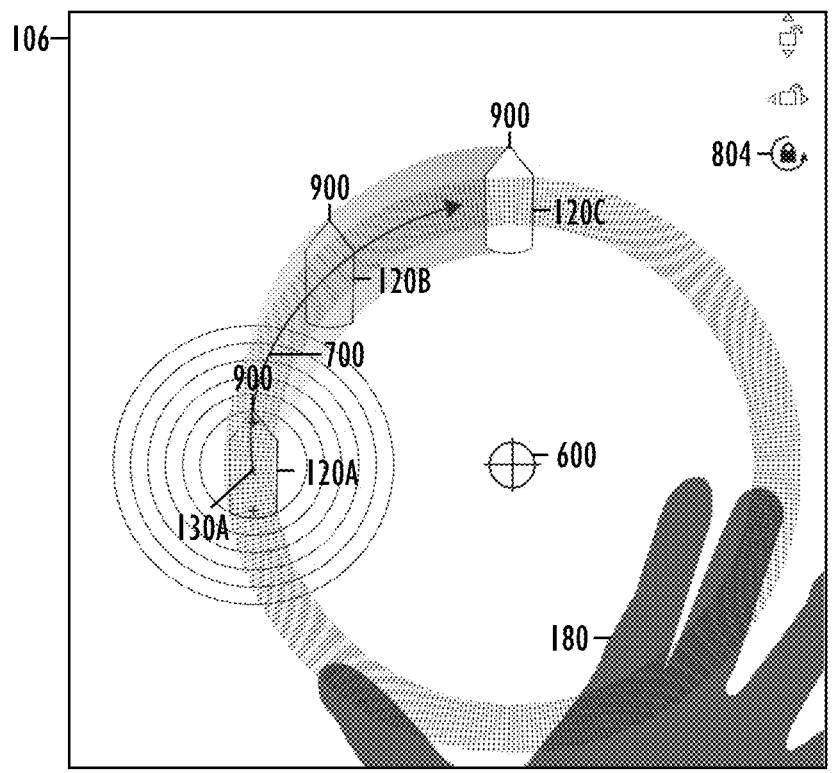

FIGS. 8 and 9 illustrate an example embodiment, wherein one or more degrees of freedom of the marine vessel 140 may be locked to further control the movement 700.

Figure 13:
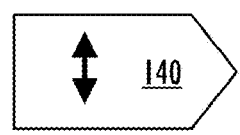
FIG. 13 illustrates degrees of freedom of the marine vessel.
Figure 13:
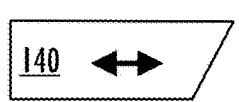
Figure 13:

FIG. 13 illustrates the degrees of freedom that may be adjusted:
a sway 800 of the marine vessel 140;
a surge 802 of the marine vessel 140; and/or
a yaw 804 of the marine vessel 140.

The one or more processing units 110 are configured to receive 212 a lock command defining a locking of one or more (sway 800/surge 802/yaw 804) of degrees of freedom of the marine vessel 140.

In an example embodiment, the one or more processing units 110 are configured to perform the locking illustrated in FIGS. 8 and 9 in a recursive fashion:
display 214 the representation 120 of the marine vessel 140 in the future geographic location 130A during the simulated movement 700 according to the control point 600 and restricted by the locking of the one or more degrees of freedom in relation to the surroundings 150 of the marine vessel 140 in the future geographic location 130A; and
either receive a confirmation command; or
receive 222 a change command locking or releasing one or more degrees of freedom and display 214 the simulated movement 700 according to the changed locking of the one or more degrees of freedom, and recursively repeat 224 until the confirmation command is received.

In the example embodiment of FIGS. 8 and 9, the yaw 804 of the marine vessel 140 is locked, and as can be seen in FIG. 9, the bow 900 of the representation 120A, 120B, 120C of the marine vessel 140 remains in the same heading during the movement 700.

Figure 11:
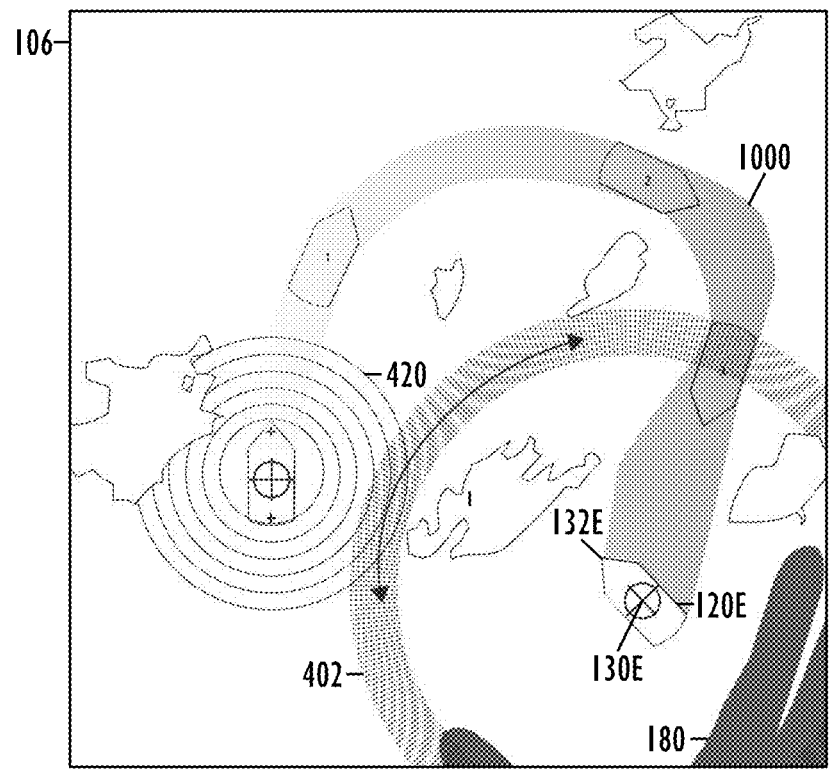

FIGS. 10 and 11 illustrate an example embodiment, wherein the movement 700 of the marine vessel 140 may be defined as a relatively complicated sequence using the techniques described with reference to FIGS. 4 to 9.

In FIG. 10, four future locations 130A, 130B, 130C, 130D with orientations 132A, 132B, 132C, 132D have already been set, and the fifth future location 130E is currently being set. As shown in FIG. 10, the default heading of the representation 132E of the marine vessel 140 is 0 degrees, whereas n FIG. 11, the user 180 has started to adjust the orientation 132E.

The one or more processing units 110 are configured to:
receive a first command defining a movement of the marine vessel 140 in the future geographic location 130A;
display a representation 130A of the marine vessel 140 in the future geographic location 130A during a simulated movement according to the first command in relation to the surroundings 150 of the marine vessel 140 in the future geographic location 130A; and
receive a second command defining a continuation movement of the marine vessel 140 in the future geographic location 130A→130B;
display a representation 120B of the marine vessel 140 in the future geographic location 130B during a simulated continuation movement according to the second command in relation to the surroundings 150 of the marine vessel 140 in the future geographic location 130B; and
either receive a confirmation command; or
receive a further command defining a further continuation movement of the marine vessel 140 in the future geographic location 130B→130C and display the simulated movement according to the further command, and recursively repeat until the confirmation command is received.

The first command, the second command, and the further command may comprise one or more of the following:
a control command defining a control point 600 for a movement of the marine vessel 140 in the future geographic location,
one or more adjustment commands adjusting the control point 600 for the movement of the marine vessel 140 in the future geographic location,
a control command comprising a pivot point defining a center point of a rotation of the marine vessel 140,
a lock command defining a locking of one or more of degrees of freedom of the marine vessel 140 comprising a sway of the marine vessel 140, a surge of the marine vessel 140, and/or a yaw of the marine vessel 140,
one or more change commands locking or releasing the one or more degrees of freedom.

Until now, the described example embodiments have illustrated the operation of the apparatus 100 of FIG. 1 with reference to the flow-chart of FIG. 2, and screenshots of FIGS. 4 to 11.

Figure 12:
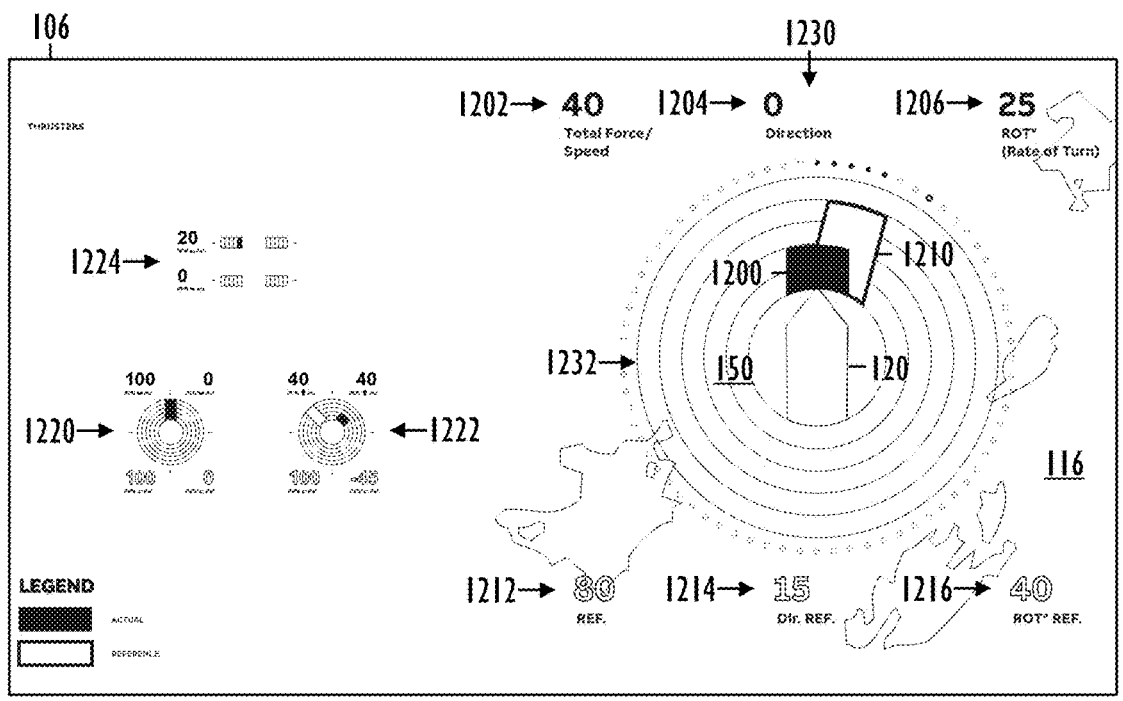

Let us now describe a different example embodiment of the operation of the apparatus of FIG. 1 with reference to the flow-chart of FIG. 3, and the screenshots of FIG. 12.

The one or more processing units 110 are configured to cause the execution of the method described in FIG. 3 in co-operation with the display 102, the input user interface 104, and the data interface 108. The method forms the backbone of an algorithm 112 running in the one or more processing units 110.

The method starts in 300, and ends in 326 after the processing is finished, or the operation may be recursively repeated 324.

In 302, control data of a current power and a current angle of the steering and propulsion system 142 is received.

In 304, control data of a reference power and a reference angle of the steering and propulsion system 142 is received.

In 306, a current representation of the current power and the current angle of the steering and propulsion system 142 in relation to the marine vessel 140 is displayed, and, in 308, a reference representation of the reference power and the reference angle of the steering and propulsion system 142 in relation to the marine vessel 140 is displayed simultaneously 320. The current representation and the reference representation are both arranged and positioned co-centrically 320 in relation to the representation 120 of the marine vessel 140.

In an optional operation 322, the marine vessel 140 is maneuvered.

In FIG. 12, the touchscreen 106 displays a graphical representation 1200 of the current power and the current angle. The representation 1200 shows the power in relation to a scale 1232 comprising five circular zones, but the power is also shown as a numerical value 1202: "40 Total Force/Speed". The representation 1200 also shows the current angle in relation to North, but the current angle is also shown as a numerical value 1204: "0 Direction". Additionally, the actual rate of turn is shown as a numerical value 1206: "25 ROT (Rate of turn)".

In a similar fashion, the touchscreen 106 displays a graphical representation 1210 of the reference power and the reference angle. The representation 1210 shows the power in relation to the scale 1232, but the power is also shown as a numerical value 1212: "80 Total Force/Speed". The representation 1210 also shows the reference angle in relation to North, but the reference angle is also shown as a numerical value 1214: "15 Direction". Additionally, the reference rate of turn is shown as a numerical value 1216: "40 ROT (Rate of turn)".

In an example embodiment, the one or more processing units 110 are configured to display 316 the current presentation such that an available range 308 of the power and an available range 308 of the angle of the steering and propulsion system 142 are displayed, wherein the available ranges are arranged and positioned co-centrically in relation to the representation 120 of the marine vessel 140. As was explained, the scale 1232 comprising a plurality of circular zones may be used to implement the available ranges co-centrically in the relation to the representation 120 of the marine vessel 140.

In an example embodiment, the one or more processing units 110 are configured to display 306 the current presentation 1200 such that a real-time or near real-time animation 314 illustrates changing of the current power and the current angle of the steering and propulsion system 142 based on the reference power and the reference angle of the steering and propulsion system. In the example embodiment of FIG. 14 this may be implemented so that the graphical actual representation 1200 evolves as an animated symbol towards the graphical reference representation 1210. Note that "current" means the actual values, whereas "reference" means values towards which the current values are adjusted.

In an example embodiment, the one or more processing units 110 are configured to, prior to displaying 306 the real-time or near real-time animation 314, receive 312 a request command defining an adjustment for the reference power and/or for the reference angle.

In an example embodiment, the steering and propulsion system 142 comprises two or more separately controllable thrusters configured to steer and propel the marine vessel 140. The one or more processing units 110 are configured to display 306, 316 the current representation 1200 and the reference representation 1210 such that a single combined vector 310, 318 presents both a magnitude of the combined power of the two or more separately controllable thrusters and a direction of the combined angle of the two or more separately controllable thrusters. With this example embodiment, the user 180 immediately sees the magnitude and direction of the combined vectors (actual and reference), whereby the user 180 is able to steer the marine vessel 140 based on a good understanding of the operation status of the steering and propulsion system 142.

Figure 14:
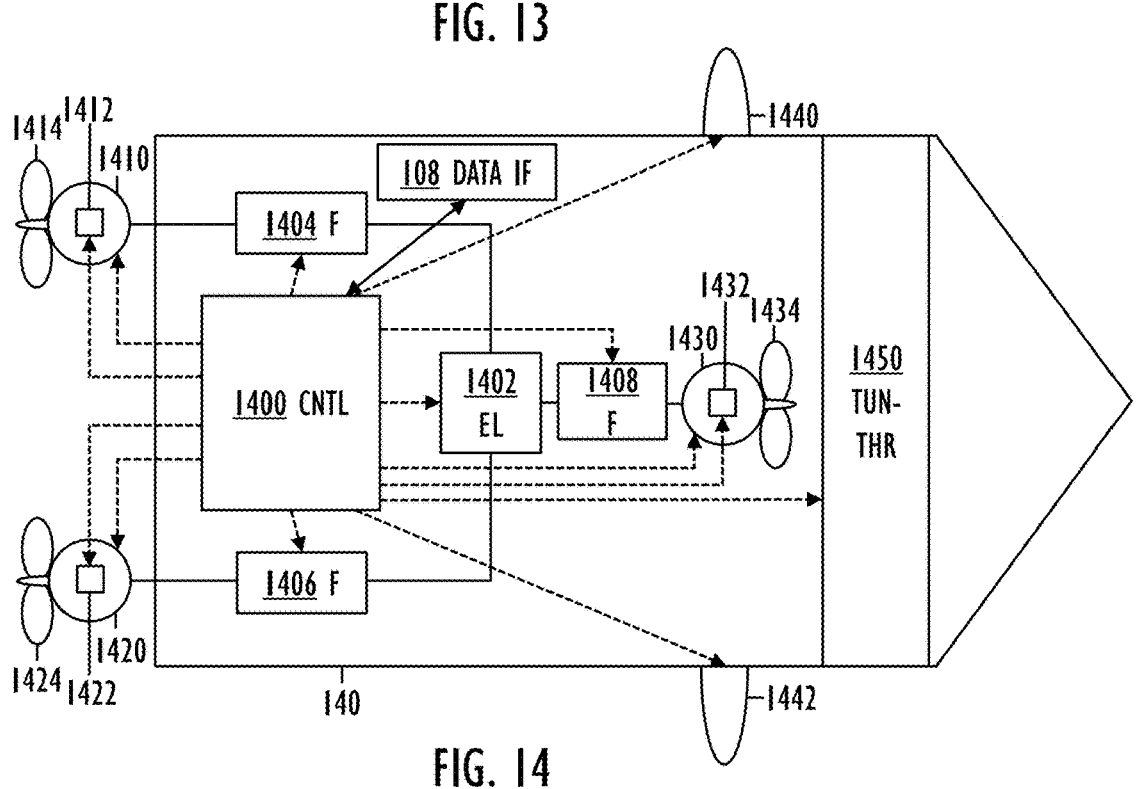
FIG. 14 illustrates an example embodiment of a steering and propulsion system of the marine vessel.

In FIG. 14, the marine vessel 140 comprises two electric podded azimuth thrusters (such as Azipod®), which each have a steerable gondola comprising electric motors 1410, 1420 coupled via frequency converters 1404, 1406 with one or more electric power sources 1402, propellers 1414, 1424, and steering devices 1412, 1422 (steering the gondolas and their thrust). The marine vessel 140 of FIG. 14 also has a bow-mounted electric podded thruster with similar parts 1408, 1430, 1432, 1434. Such marine vessel 140 may also comprise a tunnel thruster 1450 and active stabilizer fins 1440, 1442 as the two or more separately controllable thrusters. The tunnel thruster (which may be bow- or stern-mounted) 1450 is a transversal propulsion device usually operating with (electrically-powered) propellers (or even with a waterjet thruster). The active stabilizer fins 1440, 1442 emerge laterally from the hull, and their angle of attack may be changed to exert force. Naturally, the two or more separately controllable thrusters may also use other technologies such as rudders, propellers, diesel engines, solar cells, etc.

Note in FIG. 14 that the described steering and propulsion system 142 may also comprise a controller 1400 controlling the operation, and the controller 1400 is coupled with the data interface 108.

FIG. 12 illustrates that actual and reference powers and angles may additionally be shown to each separately controllable thruster as graphical symbols with numeral values 1220, 1222, 1224.

An example embodiment provides a method for maneuvering a marine vessel, comprising:

receiving control data of a current power and a current angle of a steering and propulsion system of the marine vessel;

receiving control data of a reference power and a reference angle of the steering and propulsion system; and displaying a current representation of the current power and the current angle of the steering and propulsion system in relation to the marine vessel, and displaying simultaneously a reference representation of the reference power and the reference angle of the steering and propulsion system in relation to the marine vessel, wherein the current representation and the reference representation are both arranged and positioned co-centrically in relation to a representation of the marine vessel.

Figure 15:
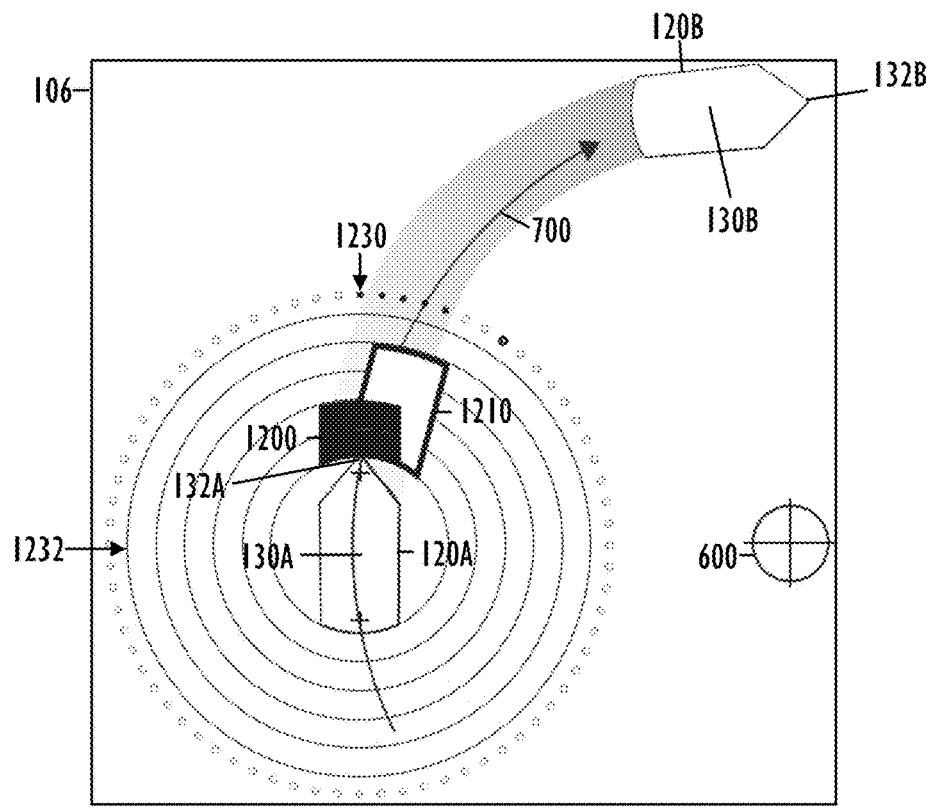
FIGS. 15 and 16 are screenshots illustrating further example embodiments of the user interface of the apparatus.
Figure 16:
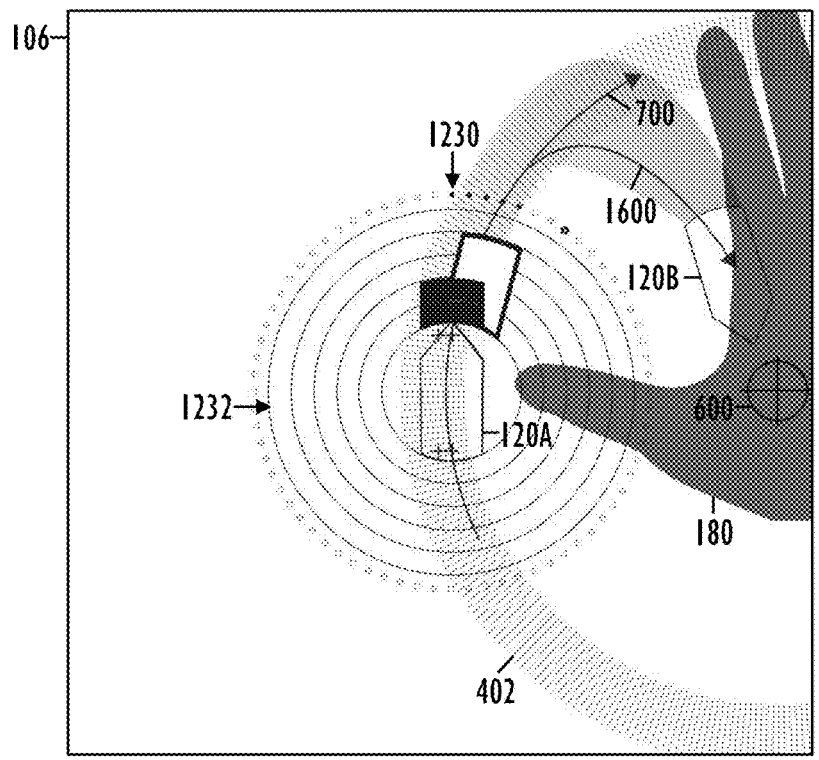

Let us finally study FIGS. 15 and 16, which illustrate that the separate methods of FIGS. 2 and 3 may also work in unison.

FIG. 15 illustrates the touchscreen 106, which displays (in a planning stage or in real-time navigation) the future geographic location (or the current geographic location) 130A and orientation 132A of the representation 120A of the marine vessel 140 and a planned movement 700 to a subsequent location 130B and orientation 132B, and, simultaneously, the current representation 1200 of the current power and the current angle of the steering and propulsion system 142 in relation to the marine vessel 140, and the reference representation 1210 of the reference power and the reference angle of the steering and propulsion system 142 in relation to the marine vessel 140.

FIG. 16 illustrates that the user 180 uses the control point 600 and in the user interface element 402 to change the planned movement 700 of the representation 120A to go along line 1600 to the representation 120B.

It will be obvious to a person skilled in the art that, as technology advances, the inventive concept can be implemented in various ways. The invention and its embodiments are not limited to the example embodiments described above but may vary within the scope of the claims.

The invention claimed is:

1. An apparatus for maneuvering a marine vessel, comprising:
    a display configured to show data of the marine vessel;
    an input user interface configured to receive commands from a user;
    a steering and propulsion system configured to steer and propel the marine vessel comprising two or more electric podded azimuth thrusters; and
    one or more processing units, communicatively coupled with the display, the input user interface, and the steering and propulsion system, and configured to:
    receive a location command defining a future geographic location for the marine vessel;
    receive an orientation command defining an orientation of the marine vessel in the future geographic location;
    receive a lock command defining a locking of one or more of degrees of freedom of the marine vessel comprising a sway of the marine vessel, a surge of the marine vessel, and/or a yaw of the marine vessel, wherein the input user interface comprises inputs for a first lock command for the sway, a second lock command for the surge, and a third lock command for the yaw, the user thereby being able to select any one or more of the first lock command, the second lock command and the third lock command;
    receive a control command defining a control point set on the input user interface for a movement of the marine vessel starting from the orientation in the future geographic location;
    display a representation of the marine vessel in the future geographic location during a simulated movement according to the control point and restricted by the locking of the one or more degrees of freedom in relation to surroundings of the marine vessel in the future geographic location;
    receive a change command locking or releasing one or more degrees of freedom and display the simulated movement according to the changed locking of the one or more degrees of freedom, and recursively repeat until a confirmation command is received;
    generate required control data for the steering and propulsion system based on the future geographic location, the orientation, the simulated movement according to the control command, the lock command, the change command, and the confirmation command; and
    maneuver the marine vessel in relation to the future geographic location using the required control data.

2. The apparatus of claim 1, wherein the one or more processing units are configured to:
    recursively repeat receiving the location command, receiving the orientation command, and generating the required control data, to create a route defined by a plurality of future geographic locations and a plurality of orientations.

3. The apparatus of claim 1, wherein the one or more processing units are configured to:
    display a representation of a route such that a shape of a presentation of the route illustrates dimensions of the marine vessel in various geographic locations and orientations along the route.

4. The apparatus of claim 3, wherein the one or more processing units are configured to:
    display an animation showing a representation of the marine vessel advancing along the representation of the route.

5. The apparatus of claim 1, wherein the one or more processing units are configured to:
    receive a real-time maneuver command during maneuvering the marine vessel in the future geographic location;
    generate further control data for the steering and propulsion system based on the maneuver command;
    maneuver the marine vessel in the future geographic location using the further control data.

6. The apparatus of claim 1, wherein the one or more processing units are configured to:
    display a representation of the marine vessel in the future geographic location in relation to surroundings of the representation of the marine vessel in the future geographic location and display simultaneously a representation of the marine vessel in a current location of the marine vessel.

7. The apparatus of claim 1, wherein the one or more processing units are configured to:
    display a warning if the future geographic location or the orientation in the future geographic location is dangerous in relation to surroundings of the marine vessel in the future geographic location.

8. The apparatus of claim 1, wherein the one or more processing units are configured to:
    display the representation of the marine vessel in the future geographic location during the simulated movement according to the control point and restricted by the locking of the one or more degrees of freedom in relation to the surroundings of the marine vessel in the future geographic location; and
    either receive a second confirmation command; or
    receive an adjustment command adjusting the control point for the movement of the marine vessel in the future geographic location and display the simulated movement according to the adjusted control point, and recursively repeat until the second confirmation command is received.

9. The apparatus of claim 1, wherein the one or more processing units are configured to:
    display a representation of the marine vessel in the future geographic location during a simulated movement according to a turning radius of the marine vessel defined in the control command in relation to the control point.

10. The apparatus of claim 1, wherein the one or more processing units are configured to:
    display a representation of the marine vessel in the future geographic location during a simulated movement according to a pivot point defined in the control command defining a center point of a rotation of the marine vessel.

11. The apparatus of claim 1, wherein the one or more processing units are configured to:
    receive a first command defining a movement of the marine vessel in the future geographic location;
    display a representation of the marine vessel in the future geographic location during a simulated movement according to the first command in relation to the surroundings of the marine vessel in the future geographic location; and receive a second command defining a continuation movement of the marine vessel in the future geographic location;

display a representation of the marine vessel in the future geographic location during a simulated continuation movement according to the second command in relation to the surroundings of the marine vessel in the future geographic location; and either receive a second confirmation command; or receive a further command defining a further continuation movement of the marine vessel in the future geographic location, and display the simulated movement according to the further command, and recursively repeat until the second confirmation command is received;

wherein the first command, the second command, and the further command comprise one or more of the following:

the control command defining a control point set on the input user interface for a movement of the marine vessel in the future geographic location, one or more adjustment commands adjusting the control point for the movement of the marine vessel in the future geographic location, a control command comprising a ship point set on the input user interface defining an adjustable location of the marine vessel, a control command comprising a pivot point defining a center point of a rotation of the marine vessel, the lock command defining the locking of one or more of degrees of freedom of the marine vessel comprising a sway of the marine vessel, a surge of the marine vessel, and/or a yaw of the marine vessel, one or more change commands locking or releasing the one or more degrees of freedom.

12. The apparatus of claim 1, wherein the display configured to show the data of the marine vessel and the input user interface configured to receive the commands from the user are integrated into a touchscreen.

\* \* \* \* \*